US012601274B1

(12) United States Patent
Hoyt et al.

(10) Patent No.: US 12,601,274 B1
(45) Date of Patent: Apr. 14, 2026

(54) OIL SHIELD FOR A ROTATING ASSEMBLY

(71) Applicant: RTX Corporation, Farmington, CT (US)

(72) Inventors: Samuel B. Hoyt, Farmington, CT (US); Stephen H. Mattia, East Haddam, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/226,845

(22) Filed: Jun. 3, 2025

(51) Int. Cl.
*F01D 11/00* (2006.01)
*F01D 25/18* (2006.01)

(52) U.S. Cl.
CPC .......... *F01D 11/003* (2013.01); *F01D 25/186* (2013.01); *F05D 2260/98* (2013.01)

(58) Field of Classification Search
CPC ........ F01D 5/082; F01D 5/083; F01D 5/3015; F01D 5/34; F01D 25/16–168; F01D 25/18; F01D 25/183; F01D 25/186; F05D 2260/98
See application file for complete search history.

(56) References Cited

U.S. PATENT DOCUMENTS 2,463,890 A * 3/1949 Lundquist ............... F16N 31/02 277/427
4,969,652 A 11/1990 Munson
5,984,636 A * 11/1999 Fahndrich ............. F01D 5/3015 415/178
8,371,127 B2 * 2/2013 Durocher .................. F02C 7/12 60/806
9,476,320 B2 * 10/2016 Savela ...................... F02C 7/20
10,612,383 B2 * 4/2020 Moniz ..................... F01D 5/084
11,255,272 B2 2/2022 James
11,725,694 B2 8/2023 Davis

* cited by examiner

*Primary Examiner* — Christopher R Legendre
(74) *Attorney, Agent, or Firm* — Getz Balich LLC

(57) ABSTRACT

An assembly for a gas turbine engine comprising a rotating structure, a bearing compartment, and an oil shield. The rotating structure extends axially along an axis and includes a rotor and an engine shaft. The bearing compartment includes a bearing assembly and a seal element. The seal element is disposed axially between the bearing assembly and the rotor. The oil shield is arranged with the rotating structure and extends radially between an inner radial body portion and an outer radial body portion. The inner radial body portion is coupled with the engine shaft. The outer radial body portion extends axially between a first curved surface and a second curved surface. The oil shield is configured to direct lubricant leaked from the bearing compartment away from the rotor.

18 Claims, 7 Drawing Sheets

OIL SHIELD FOR A ROTATING ASSEMBLY

BACKGROUND OF THE INVENTION

1. Technical Field

The present disclosure relates to an oil shield for a rotating assembly, in general, and to an oil shield to prevent migration of lubricant to a rotor section, in particular.

2. Background Information

Gas turbine engines include bearing assemblies that support rotatable shafts. These bearings assemblies require lubricant. Various seals near the rotating shafts contain oil within bearing compartments, which include bearings and seals. During operation of the gas turbine engine, bearings burping of seals causes lubricant to leak from the bearing compartment and migrate towards a rotor section. While convention methods of preventing lubricant from pooling in a rotor section is known, there is room in the art for improvement.

SUMMARY

According to an aspect of the present disclosure, an assembly for a gas turbine engine is provided. The assembly comprises a rotating structure, a bearing compartment, and an oil shield. The rotating structure extends axially along an axis and includes a rotor and an engine shaft. The bearing compartment includes a bearing assembly and a seal element. The seal element is disposed axially between the bearing assembly and the rotor. The oil shield is arranged with the rotating structure and extends radially between an inner radial body portion and an outer radial body portion. The inner radial body portion is coupled with the engine shaft. The outer radial body portion extends axially between a first curved surface and a second curved surface. The oil shield is configured to direct lubricant leaked from the bearing compartment away from the rotor.

In any aspects or embodiments described above and herein, the rotor includes an end, a rotor bore and a rotor cavity. The end is coupled in rotational engagement with the engine shaft, and the rotor bore extends radially within the end from an inner bore surface to an outer bore surface. The rotor cavity is formed within the rotor and extends radially between an inner radial cavity surface and an outer radial cavity surface of the rotor. The rotor cavity extends axially between a forward interior surface and an aft interior surface of the rotor.

The oil shield may be located radially inboard of the outer bore surface. The oil shield may be disposed along the axis radially between the rotor cavity and the bearing compartment.

In any aspects or embodiments described above and herein, the first curved surface of the oil shield is a convex surface facing the rotor. The second curved surface of the oil shield is a concave surface facing the bearing compartment.

In any aspects or embodiments described above and herein, the second curved surface of the oil shield includes ribs extending radially outward from the outer radial body portion.

In any aspects or embodiments described above and herein, the second curved surface includes a plurality of grooves. The plurality of grooves extend laterally between lateral sides of the second curved surface. The grooves extend radially within the second curved surface.

In any aspects or embodiments described above and herein, the outer radial body portion includes an impeller section and an aperture. The aperture extends between the first curved surface and the second curved surface. The impeller section includes a plurality of airfoils. Each of the plurality of airfoils extends spanwise from a base to a blade tip, and chordwise between a leading edge and a trailing edge.

In any of the aspects or embodiments described above and herein, the oil shield is longitudinally spaced from the seal element.

In any of the aspects or embodiments described above and herein, the assembly further includes a static structure and an outer plenum. The static structure extends axially along the axis and is disposed radially outboard of the engine shaft. The outer plenum is located radially outboard of and circumscribes the static structure. The bearing assembly is coupled with and supports the static structure. The seal element is mounted to the static structure and projects radially from the static structure towards the engine shaft.

In any of the aspects or embodiments described above and herein, the assembly is disposed within a compressor section of a gas turbine engine.

According to an aspect of the present disclosure, an oil shield for a rotating structure of a gas turbine engine is provided. The oil shield comprises an annular body extending circumferentially about a central axis. The annular body includes an inner radial body portion, an outer radial body portion and an interface therebetween. The inner radial body portion extends between an inner circumferential surface and the interface. The inner radial body portion is configured for couplable engagement with the rotating structure. The outer radial body portion extends axially between a first curved surface and a second curved surface. The outer radial body portion extends radially between the interface and an outer circumferential surface.

In any of the aspects or embodiments described above and herein, the first curved surface is configured as a convex surface, and the second curved surface is configured as a concave surface.

In any of the aspects or embodiments described above and herein, the second curved surface includes ribs extending radially outward from the outer radial body portion towards the outer circumferential surface.

In any of the aspects or embodiments described above and herein, the second curved surface includes a plurality of grooves. The plurality of grooves extend laterally between lateral sides of the second curved surface, and radially within the second curved surface from the interface towards the outer circumferential surface.

In any of the aspects or embodiments described above and herein, the outer radial body portion includes an impeller section and an aperture. The aperture extends between the first curved surface and the second curved surface. The impeller section includes a plurality of airfoils. Each of the plurality of airfoils extending spanwise from a base to a blade tip, and chordwise between a leading edge and a trailing edge.

According to an aspect of the present disclosure, an assembly for a gas turbine engine is provided. The assembly includes a rotating structure, a static structure, a bearing compartment, an outer plenum, and an oil shield. The rotating structure extends axially along an axis and includes a rotor and an engine shaft. The static structure extends axially along the axis and is disposed radially outboard of the engine shaft. The bearing compartment includes a bearing assembly and a seal element. The seal element is disposed axially between the bearing assembly and the rotor. The bearing assembly is coupled with and supports the static structure. The seal element is mounted to the static structure and projects radially inward from the static structure towards the engine shaft. The outer plenum is located radially outboard of and circumscribes the static structure. The oil shield is arranged with the rotating structure and extends radially between an inner radial body portion and an outer radial body portion. The inner radial body portion is coupled with the engine shaft and longitudinally spaced from the seal element.

In any of the aspects or embodiments described above and herein, the outer radial body portion extends axially between a first curved surface and a second curved surface. The second curved surface is configured to direct liquid leaked from the bearing compartment away from the rotor.

In any of the aspects or embodiments described above and herein, the rotor includes an end, a rotor bore and a rotor cavity. The end is coupled with the engine shaft, and the rotor bore extends radially within the end from an inner bore surface to an outer bore surface. The rotor cavity is formed within the rotor and extends radially between an inner radial cavity surface and an outer radial cavity surface of the rotor. The rotor cavity extends axially between a forward interior surface and an aft interior surface of the rotor.

In any of the aspects or embodiments described above and herein, the oil shield is located radially inboard of the outer bore surface.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
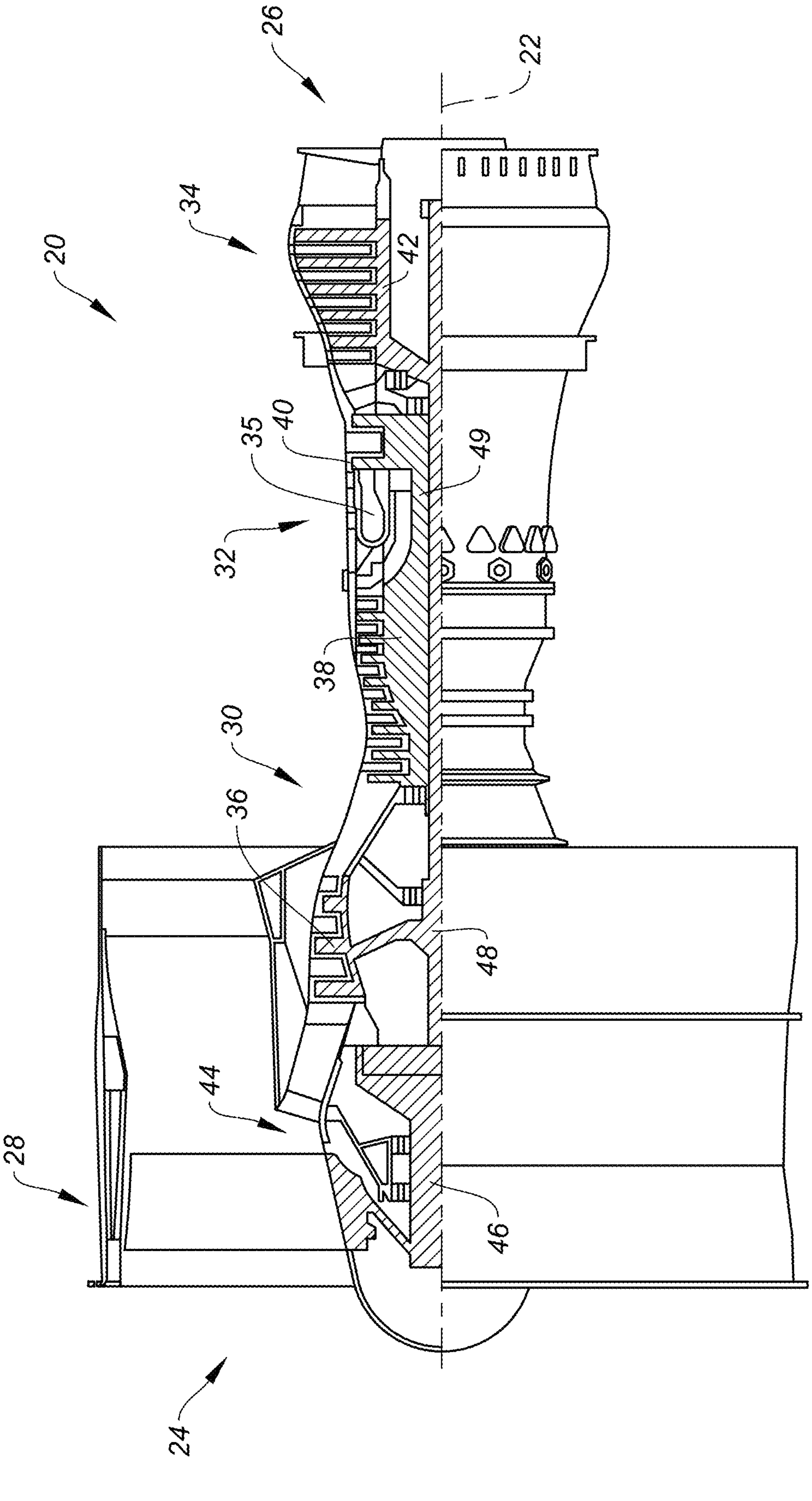
FIG. 1 is a schematic illustration of a gas turbine engine according to an embodiment of the present disclosure.

FIG. 1 depicts a partially sectioned diagrammatic view of a gas turbine engine 20. The gas turbine engine 20 extends along an engine centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes a combustor 35. The compressor section 30 includes a low-pressure compressor (LPC) 36 and a high-pressure compressor (HPC) 38. The turbine section 34 includes a high-pressure turbine (HPT) 40 and a low-pressure turbine (LPT) 42. The engine 20 may be described as having an outer casing disposed radially outside of the compressor, combustor, and turbine sections 30, 32, 34 that defines an outer radial boundary of the core gas path through the engine 20. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 49. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration, including the two-spool engine configuration shown, and may be utilized with single spool gas turbine engines as well as three spool gas turbine engines and the like.

The gas turbine engine 20 may be configured as a turbofan engine, a turbojet engine, a turboprop engine, a turboshaft engine, a propfan engine, a pusher fan engine or any other type of gas turbine engine. The gas turbine engine 20 may alternatively be configured as an auxiliary power unit (APU) or an industrial gas turbine engine. The present disclosure therefore is not limited to any particular types or configurations of gas turbine engines.

Figure 2:
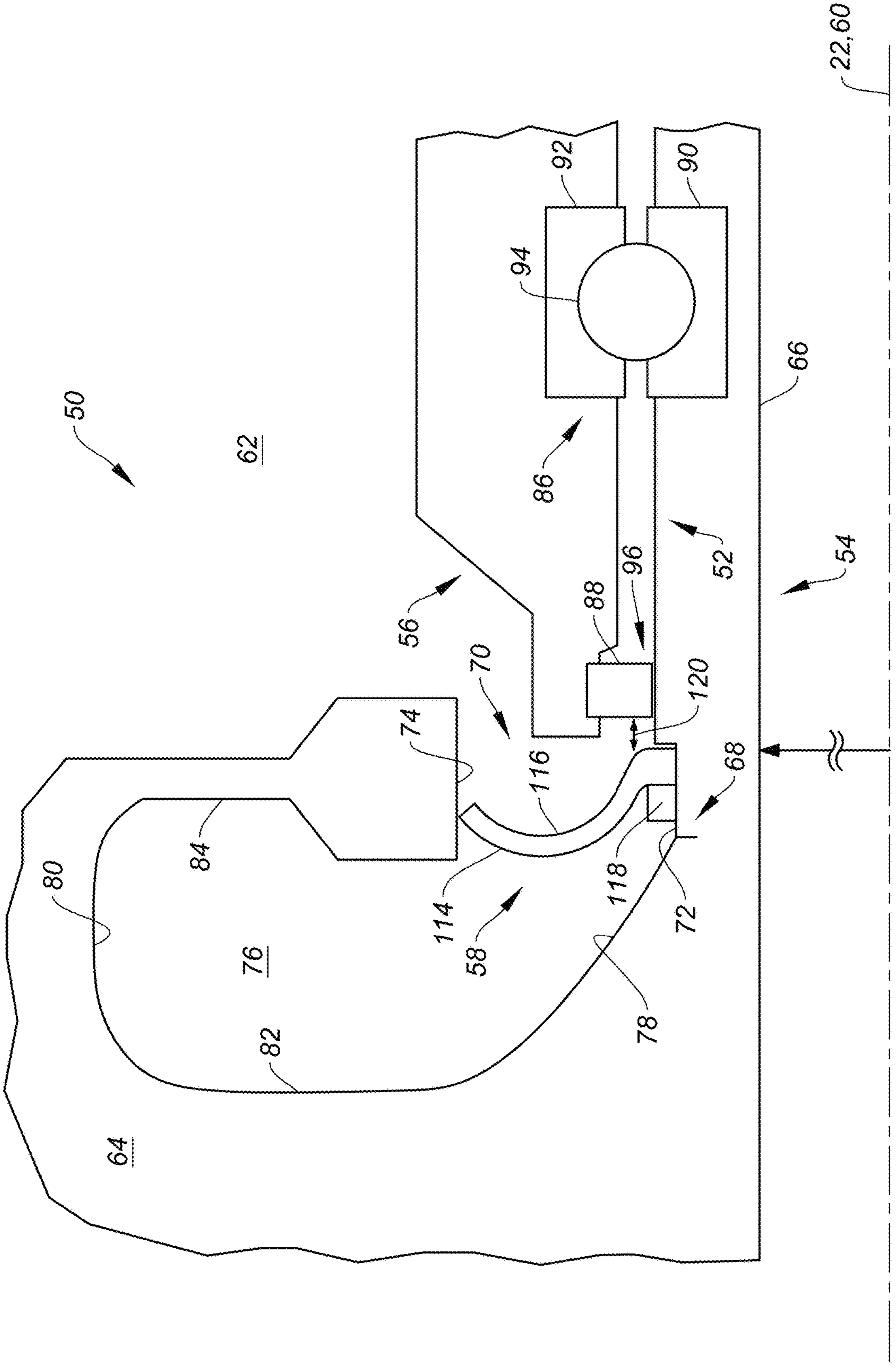
FIG. 2 is a schematic illustration of a portion of the gas turbine engine of FIG. 1, according to an embodiment of the present disclosure.

FIG. 2 is a partial cross-sectional view of an assembly 50 of the gas turbine engine 20. The assembly 50 includes a bearing compartment 52, a rotating structure 54, a static structure 56, and an oil shield 58. The assembly 50 extends forward and aft along an axis 60. The axis 60 may be a rotational axis of one or more components (e.g., rotors) of the gas turbine engine 20 and/or may be the engine centerline 22 in general. An outer plenum 62 is disposed radially outboard of the static structure 56 and extends axially along the axis 60, circumscribing the static structure 56. The static structure 56 may be, for example, a load-bearing structure (e.g., a support) for one or more components of the bearing compartment 52. The static structure 56 extends axially along the axis 60 and is disposed radially outboard of an engine shaft 66.

The assembly 50 may be disposed in the compressor section 30, for example, in a portion of the high pressure compressor (HPC) 38 which is proximate (e.g., adjacent to) the combustor 35. Other locations for the assembly 50 are not meant to be precluded. For example, the assembly 50 may be disposed in the low pressure compressor (LPC) 36 of the compressor section 30, the low pressure turbine (LPT)

42 of the turbine section 34 and/or the high pressure turbine (HPT) 40 of the turbine section 34.

The rotating structure 54 includes a rotor 64 (e.g., a compressor rotor, a turbine rotor) and the engine shaft 66. The rotating structure 54 may be or otherwise form a portion of a spool of the gas turbine engine 20 (e.g., a low spool or a high spool). The rotating structure 54 is configured to rotate about the axis 60, which may be the engine centerline 22 of the gas turbine engine 20. The rotor 64 is connected to (e.g., formed integral with, or fastened, welded, bonded and/or otherwise attached to) the engine shaft 66 at an axial end 68 of the rotor. A rotor bore 70 extends radially within the rotor axial end 68 from an inner bore surface 72 to an outer bore surface 74. The rotor bore 70 is in fluid communication with a rotor cavity 76 disposed forward of the rotor bore 70. The rotor cavity 76 is formed within the rotor 64 and extends radially between an inner radial cavity surface 78 and an outer radial cavity surface 80 of the rotor 64. The rotor cavity 76 extends axially between a forward interior surface 82 and an aft interior surface 84 of the rotor 64.

The bearing compartment 52 includes a bearing assembly 86 and a seal element 88. The seal element 88 is configured to seal the bearing compartment 52 and maintain fluid pressure, particularly oil pressure, in the bearing compartment 52 during operation of the gas turbine engine 20. The bearing assembly 86 may include an inner race 90, an outer race 92, and rolling elements 94, such as balls, configured to roll between the inner race 90 and the outer race 92. The bearing assembly 86 is mounted relative to the engine shaft 66 of the gas turbine engine 20. The engine shaft 66 may be rotatably mounted about the axis 60 by one or more bearing assemblies, including additional bearing assemblies within the bearing compartment 52 or in other bearing compartments in the gas turbine engine 20. The bearing compartment 52 is representative of any bearing compartment within the gas turbine engine 20.

The seal element 88 is configured to establish a seal for the bearing compartment 52, and in particular to keep liquid (e.g., lubricants such as oil) in the bearing compartment 52, which, in turn, maintains oil pressure in the bearing compartment 52. The static structure 56 is coupled with and supported by the bearing assembly 86, for example, at the outer race of the bearing assembly 86. The seal element 88 of FIG. 2 is mounted to the static structure 56, and therefore does not rotate during operation of the gas turbine engine 20. The seal element 88 can be arranged with the static structure 56 such that the seal element 88 may contact the engine shaft 66 or may be arranged to form a gap 96 between the seal element 88 and the engine shaft 66 during operation of the gas turbine engine 20.

Figure 3:
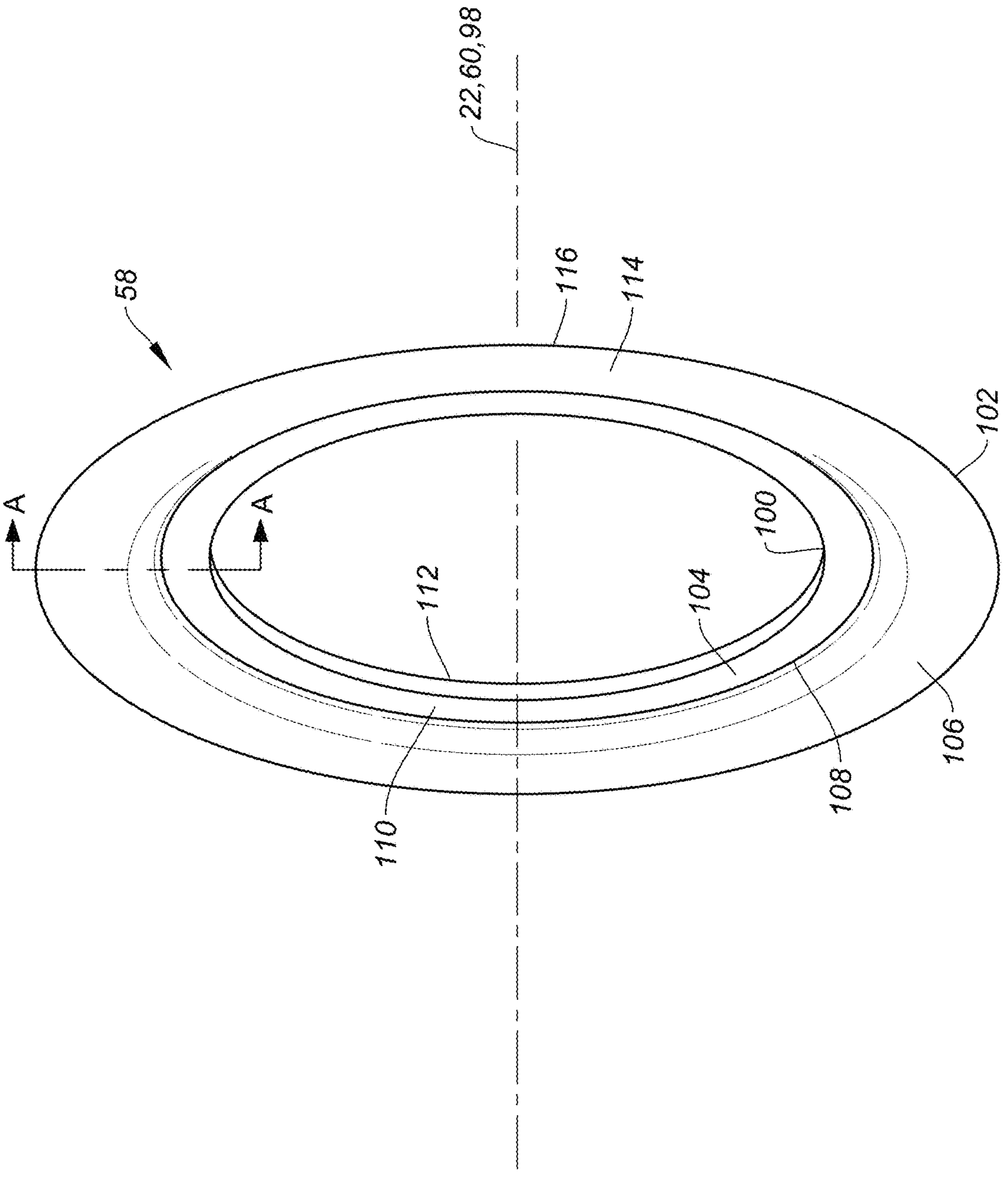
FIG. 3 is an isometric view of an oil shield according to an embodiment of the present disclosure.
Figure 3A:
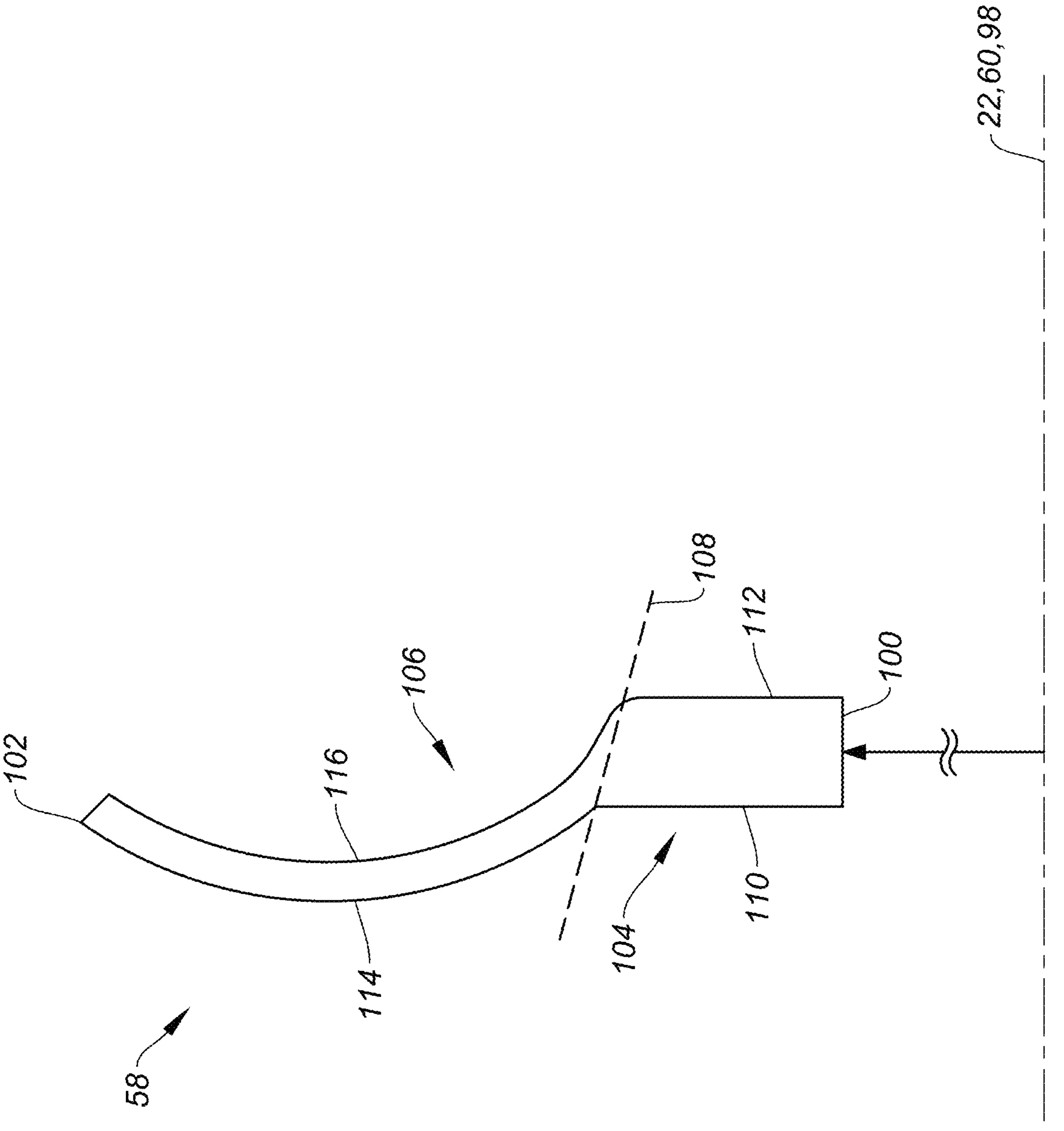
FIG. 3A is a diagrammatic cross-sectional view of the oil shield of FIG. 3, along lines A-A schematic illustration of a machining device according to an embodiment of the present disclosure.

Referring to FIGS. 3 and 3A, the oil shield 58 extends circumferentially about a central axis 98 in an annular (e.g., full hoop) configuration. The central axis 98 may include or otherwise form the engine centerline 22 and/or the axis 60. The oil shield 58 includes an inner circumferential surface 100, an outer circumferential surface 102, an inner radial body portion 104 and an outer radial body portion 106. An interface 108 is disposed between the inner radial body portion 104 and the outer radial body portion 106. The inner radial body portion 104 includes a first thickness extending axially along the central axis between a forward face 110 and a rearward face 112. The forward face 110 and the rearward face 112 extend radially from the inner circumferential surface 100 to the interface 108. The outer radial body portion 106 extends radially from the outer circumferential surface 102 to the interface 108. A cross-sectional geometry of the outer radial body portion 106 may be curved (e.g., C-shaped). The outer radial body portion 106 includes a second thickness extending axially between a first curved (e.g., convex) surface 114 and a second curved (e.g., concave) surface 116. The second thickness may be equal to or less than the first thickness.

Referring to FIG. 2, the oil shield 58 is arranged with the rotating structure 54. The oil shield 58, for example, may be mounted to the engine shaft 66 and coupled thereto using a threaded fastener 118 to secure the oil shaft axially and radially within the rotating structure 54. The oil shield 58 may be disposed, for example, axially between the bearing compartment 52 and the rotor cavity 76. The oil shield 58 may be secured to the rotating structure 54 and the engine shaft 66 proximate (e.g., at, within or adjacent to) the rotor bore 70. The oil shield 58 of FIG. 2, for example, may be located radially inboard of the outer bore surface 74, such that the oil shield 58 is longitudinally spaced apart from the seal element 88 by a distance 120. The oil shield 58 is secured to the rotating structure 54 with the second curved surface 116 facing the bearing compartment 52 and the first curved surface 114 facing the rotor cavity 76. In some embodiments, the oil shield 58 may be formed integral with the engine shaft 66.

Figure 4:
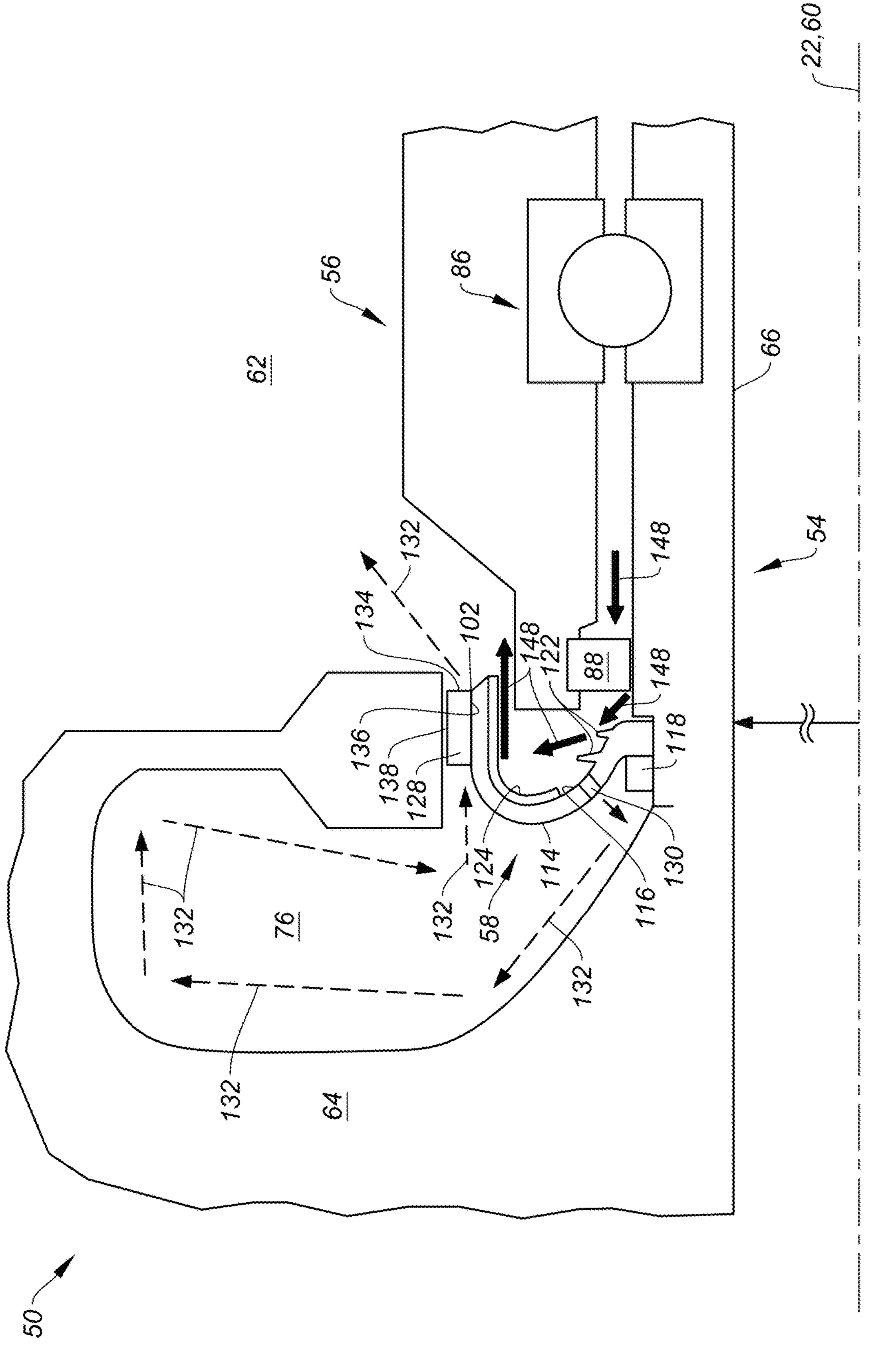
FIG. 4 is a schematic illustration of a portion of the gas turbine engine of FIG. 1, according to an embodiment of the present disclosure.

In some embodiments, referring now to FIG. 4, the second curved surface 116 of the oil shield 58 includes ribs 122 extending radially outward from the outer radial body portion 106 towards the outer circumferential surface 102. The ribs 122 may be disposed, for example, on the second curved surface 116 adjacent the inner radial body portion 104. In such an arrangement, the ribs 122 are configured to deflect liquids (e.g., lubricant) radially outwards and away from the rotor cavity 76.

Figure 5:
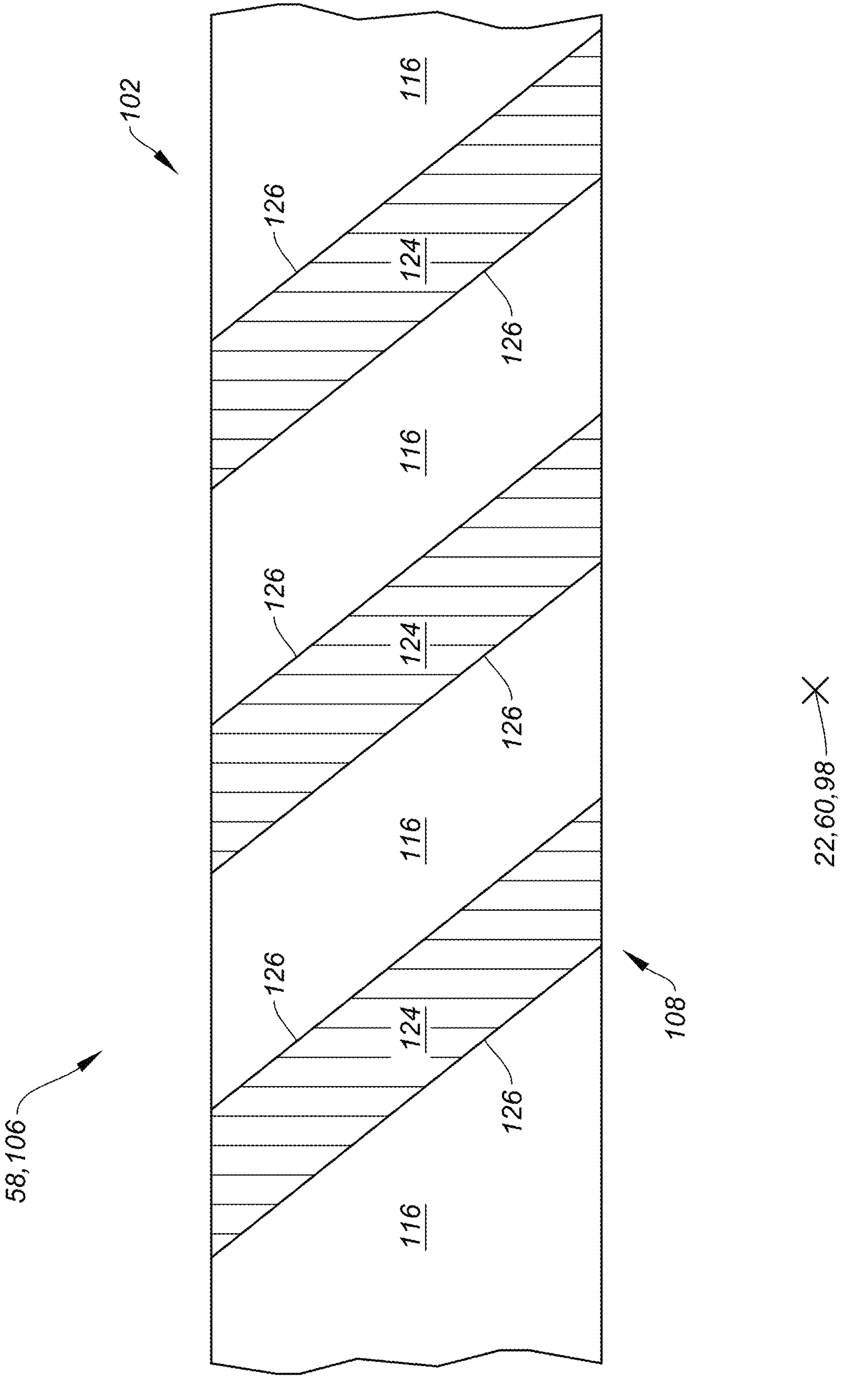
FIG. 5 is an enlarged diagrammatic view of a portion of the oil shield of FIG. 4, displaying grooves.

The oil shield 58 may alternatively or additionally include grooves 124 (e.g., rifling) within the second curved surface 116. With additional reference to FIG. 5, each groove 124 extend laterally within the second curved surface 116 between lateral ends 126 of a respective groove 124. The grooves 124 extend radially along the second curved surface 116 between the interface 108 and the outer circumferential surface 102. The grooves 124 are configured to direct liquids (e.g., lubricant) in a direction radially outwards and aft, towards the static structure 56 and/or the outer plenum 62.

Figure 6:
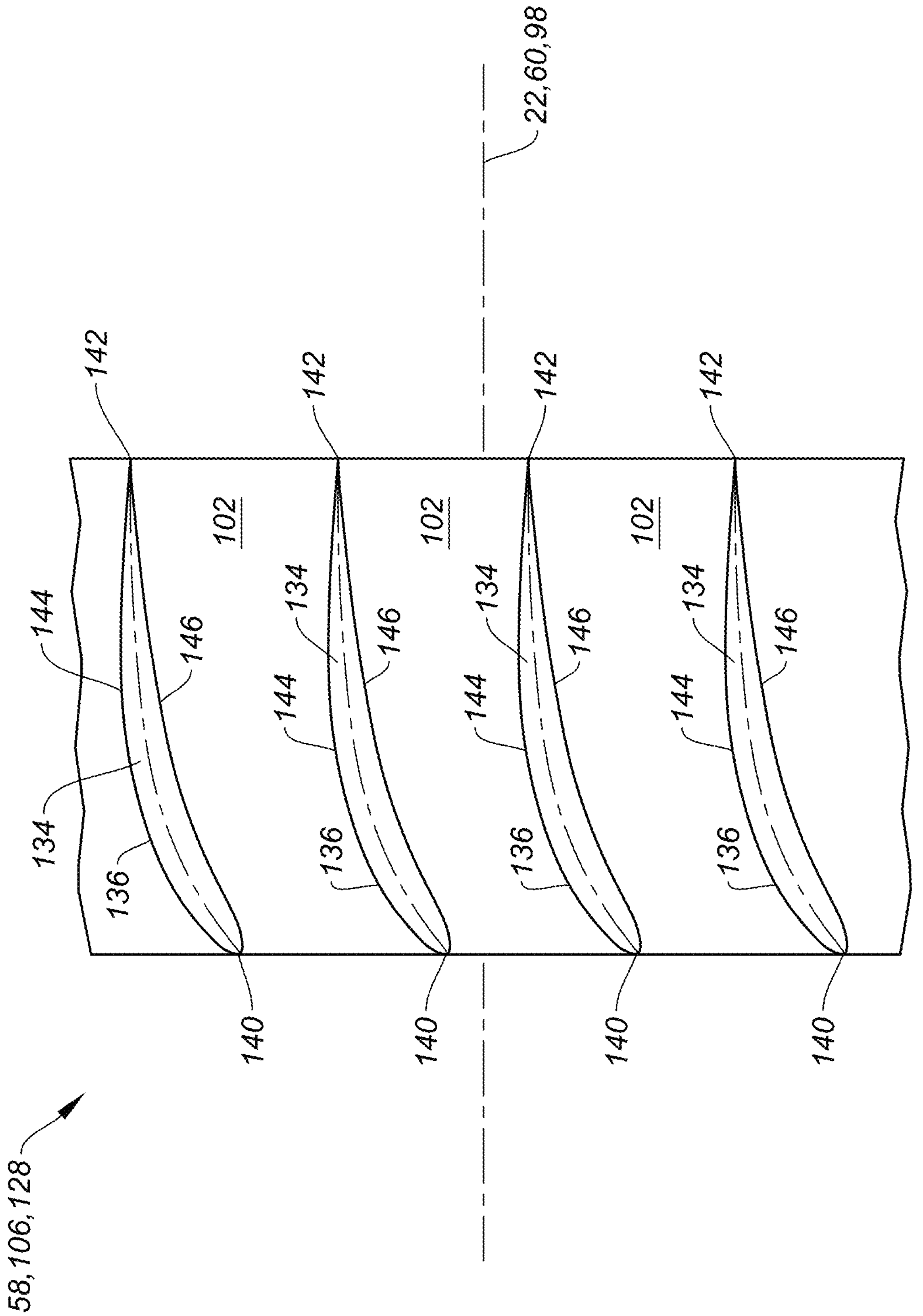
FIG. 6 is an enlarged diagrammatic view of a portion of the oil shield of FIG. 4, displaying an impeller section.

In some embodiments, referring to FIGS. 4 and 6, the outer circumferential surface 102 may include an impeller section 128 and the outer radial body portion 106 may include an aperture 130 extending from the first curved surface 114 to the second curved surface 116. The aperture 130 is configured to direct an airflow 132 towards the rotor cavity 76. The impeller section 128 includes a plurality of airfoils 134 extending spanwise from a base 136 to a blade tip 138. The airfoils 134 extend chordwise between a leading edge 140 and a trailing edge 142. The airfoils 134 have a thickness that extends between a suction side exterior surface 144 and a pressure side exterior surface 146. The impeller section 128 is configured to direct the airflow 132 within the rotor cavity 76 towards the outer plenum 62.

During operation of conventional assemblies within gas turbine engines, some quantity of liquid (e.g., lubricant such as oil) within bearing compartment(s) will leak between a seal element and an engine shaft. Migration of the lubricant to within the rotor cavity 76 can result in the lubricant coking onto an outer radial cavity surface of a rotor. This can result in rotor imbalance which can produce losses within a gas turbine engine.

The oil shield 58 of the present disclosure prevents migration of lubricants towards the rotor cavity 76. Referring now to FIG. 4, a leakage flow 148 of liquid from the bearing compartment 52 is deflected by the oil shield 58 and directed away from the rotor cavity 76, towards the outer plenum 62. The oil shield 58 of the present disclosure will therefore prevent, reduce, and/or eliminate the migration of liquid leaked from the bearing compartment 52 to the rotor cavity 76 which would otherwise produce oil coking and rotor imbalances. Furthermore, convention assemblies utilizing oil weep holes machined into rotor arms introduce high stress and life limited locations within a rotor assembly. The assembly 50 including the oil shield 58 of the present disclosure mitigates, prevents, and/or eliminates these associated drawbacks, as the lubricant will be deflected away from the rotor assembly.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An assembly for a gas turbine engine, comprising:

a rotating structure extending axially along an axis and including a rotor and an engine shaft;

a bearing compartment including a bearing assembly and a seal element, the seal element disposed axially between the bearing assembly and the rotor; and an oil shield arranged with the rotating structure and extending radially between an inner radial body portion and an outer radial body portion, the inner radial body portion coupled with the engine shaft, the outer radial body portion extending axially between a first curved surface and a second curved surface, and the oil shield is configured to direct lubricant leaked from the bearing compartment away from the rotor;

the rotor including an inner bore surface, an outer bore surface, an end, a rotor bore and a rotor cavity, the end coupled in rotational engagement with the engine shaft, the rotor bore extending radially between the inner bore surface and the outer bore surface, and the rotor cavity formed within the rotor and extending radially between an inner radial cavity surface of the rotor and an outer radial cavity surface of the rotor, and the rotor cavity extending radially between a forward interior surface of the rotor and an aft interior surface of the rotor.

2. The assembly of claim 1, wherein the oil shield is located radially inboard of the outer bore surface.

3. The assembly of claim 1, wherein the oil shield is disposed along the axis radially between the rotor cavity and the bearing compartment.

4. The assembly of claim 1, wherein the first curved surface of the oil shield is a convex surface facing the rotor; and the second curved surface of the oil shield is a concave surface facing the bearing compartment.

5. The assembly of claim 1, wherein the second curved surface of the oil shield includes ribs extending radially outward from the outer radial body portion.

6. The assembly of claim 1, wherein
the second curved surface includes a plurality of grooves; and
the plurality of grooves extend laterally within the second curved surface, and the plurality of grooves extend radially within the second curved surface.

7. The assembly of claim 1, wherein
the outer radial body portion includes an impeller section and an aperture;
the aperture extending between the first curved surface and the second curved surface; and
the impeller section includes a plurality of airfoils, each of the plurality of airfoils extending spanwise from a base to a blade tip, and each of the plurality of airfoils extending chordwise between a leading edge and a trailing edge.

8. The assembly of claim 1, wherein the oil shield is longitudinally spaced from the seal element.

9. The assembly of claim 1, further comprising:
a static structure extending axially along the axis and disposed radially outboard of the engine shaft; and
an outer plenum located radially outboard of and circumscribing the static structure;
the bearing assembly coupled with and supporting the static structure; and
the seal element is mounted to the static structure and projects radially from the static structure towards the engine shaft.

10. The assembly of claim 1, wherein the assembly is disposed within a compressor section of a gas turbine engine.

11. The assembly of claim 1, wherein the oil shield is located axially between the rotor cavity and the bearing compartment.

12. An oil shield for a rotating structure of a gas turbine engine, comprising:
an annular body extending circumferentially about a central axis, the annular body including an inner radial body portion, an outer radial body portion and an interface therebetween;
the inner radial body portion extending between an inner circumferential surface and the interface, the inner radial body portion configured for couplable engagement with the rotating structure; and
the outer radial body portion extending axially between a first curved surface and a second curved surface, the outer radial body portion extending radially between the interface and an outer circumferential surface, the first curved surface configured as a convex surface and the second curved surface configured as a concave surface;
wherein the second curved surface includes a plurality of grooves, the plurality of grooves extend laterally within the second curved surface, and the plurality of grooves extend radially within the second curved surface from the interface towards the outer circumferential surface.

13. The oil shield of claim 12, wherein the second curved surface includes ribs extending radially outward from the outer radial body portion towards the outer circumferential surface.

14. The oil shield of claim 12, wherein
the outer radial body portion includes an impeller section and an aperture;
the aperture extends between the first curved surface and the second curved surface; and
the impeller section includes a plurality of airfoils, each of the plurality of airfoils extending spanwise from a base to a blade tip, and each of the plurality of airfoils extending chordwise between a leading edge and a trailing edge.

15. An assembly for a gas turbine engine, comprising:
a rotating structure extending axially along an axis and including a rotor and an engine shaft, the rotor including an inner bore surface, an outer bore surface, a rotor bore and a rotor cavity, and the rotor bore extends radially between the inner bore surface and the outer bore surface;
a static structure extending axially along the axis and disposed radially outboard of the engine shaft;
a bearing compartment including a bearing assembly and a seal element, the seal element disposed axially between the bearing assembly and the rotor, the bearing assembly coupled with and supporting the static structure, and the seal element mounted to the static structure and projecting radially inward from the static structure towards the engine shaft;
an outer plenum located radially outboard of and circumscribing the static structure; and
an oil shield arranged with the rotating structure and extending radially between an inner radial body portion and an outer radial body portion, the oil shield located axially between the rotor cavity and the bearing compartment, and the inner radial body portion coupled with the engine shaft and longitudinally spaced from the seal element.

16. The assembly of claim 15, wherein the outer radial body portion extends axially between a first curved surface and a second curved surface, the second curved surface configured to direct liquid leaked from the bearing compartment away from the rotor.

17. The assembly of claim 15, wherein the oil shield is located radially inboard of the outer bore surface.

18. The assembly of claim 15, wherein
the oil shield includes a first curved surface and a second curved surface;
the second curved surface includes a plurality of grooves; and
the plurality of grooves extend laterally and radially within the second curved surface.

* * * * *